United States Patent
Lee et al.

(10) Patent No.: US 10,064,141 B2
(45) Date of Patent: Aug. 28, 2018

(54) CORE FREQUENCY/COUNT DECISION-BASED THERMAL MITIGATION OPTIMIZATION FOR A MULTI-CORE INTEGRATED CIRCUIT

(71) Applicant: QUALCOMM INCORPORATED, San Diego, CA (US)

(72) Inventors: Kwangyoon Lee, San Diego, CA (US); Adam Cunningham, San Diego, CA (US); Melanie Dolores Oclima, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/448,300

(22) Filed: Mar. 2, 2017

(65) Prior Publication Data
US 2018/0167878 A1 Jun. 14, 2018

Related U.S. Application Data
(60) Provisional application No. 62/432,101, filed on Dec. 9, 2016.

(51) Int. Cl.
*H04W 52/00* (2009.01)
*H04W 52/02* (2009.01)

(52) U.S. Cl.
CPC ..... *H04W 52/029* (2013.01); *H04W 52/0251* (2013.01); *H04W 52/0258* (2013.01); *H04W 52/0261* (2013.01)

(58) Field of Classification Search
CPC .................................................. H04W 52/0287
See application file for complete search history.

(56) References Cited

U.S. PATENT DOCUMENTS 8,689,021 B1 * 4/2014 Bai ........................... G06F 1/28
713/300
2005/0046400 A1 * 3/2005 Rotem .................. G06F 1/3203
323/234

(Continued)

OTHER PUBLICATIONS

IEEE Press, "EVA: an efficient vision architecture for mobile systems Proceedings of the 2013 International Conference on Compilers, Architectures and Synthesis for Embedded Systems," Sep. 2013, 10 pages.

*Primary Examiner* — Wen Huang
(74) *Attorney, Agent, or Firm* — Smith Tempel Blaha LLC/Qualcomm

(57) ABSTRACT

Systems, methods, and computer programs are disclosed for providing optimal power/performance thermal mitigation in a portable computing device having a plurality of processing cores. An exemplary method comprises storing a power sweep table defining a power consumption value for each of a plurality of core frequency and core count combinations for an integrated circuit having a plurality of processing cores. A search table is generated by filtering the power sweep table based on one or more configuration parameters associated with the integrated circuit. A target power level is selected to sustain a thermal power envelope for the integrated circuit. The search table is traversed to find one of the plurality of core frequency and core count combinations having a corresponding power consumption value that matches the target power level.

22 Claims, 10 Drawing Sheets

(56) References Cited

U.S. PATENT DOCUMENTS

| | | | |
|---|---|---|---|
| 2006/0149975 A1* | 7/2006 | Rotem | G06F 1/206 |
| | | | 713/300 |
| 2007/0156370 A1* | 7/2007 | White | G06F 1/206 |
| | | | 702/132 |
| 2007/0234091 A1* | 10/2007 | Vishin | G06F 1/3203 |
| | | | 713/322 |
| 2009/0066425 A1* | 3/2009 | Seo | H03L 7/099 |
| | | | 331/34 |
| 2009/0089543 A1* | 4/2009 | Gunther | G06F 9/30181 |
| | | | 712/30 |
| 2012/0036398 A1* | 2/2012 | Moyer | G06F 9/505 |
| | | | 714/48 |
| 2013/0227326 A1* | 8/2013 | Gwak | G06F 1/3287 |
| | | | 713/324 |
| 2014/0068285 A1* | 3/2014 | Lee | G06F 1/324 |
| | | | 713/300 |
| 2014/0195829 A1* | 7/2014 | Bhandaru | G06F 1/26 |
| | | | 713/300 |
| 2014/0237267 A1* | 8/2014 | Wang | G06F 1/26 |
| | | | 713/300 |
| 2015/0006915 A1* | 1/2015 | Ganesan | G06F 1/26 |
| | | | 713/300 |
| 2015/0338902 A1 | 11/2015 | Mittal et al. | |
| 2016/0062447 A1* | 3/2016 | Hsu | G06F 1/3243 |
| | | | 713/300 |
| 2016/0124659 A1 | 5/2016 | Oportus Valenzuela et al. | |
| 2016/0224452 A1 | 8/2016 | Park et al. | |
| 2016/0232091 A1 | 8/2016 | Wang et al. | |
| 2016/0246343 A1* | 8/2016 | Pagarkar | G06F 1/3243 |
| 2016/0342198 A1* | 11/2016 | Hsu | G06F 1/3296 |
| 2017/0212792 A1* | 7/2017 | Huang | G06F 1/3228 |

* cited by examiner

POWER CONSUMPTION VALUES (W) — 400

| Big Freq | Little Freq | 1 Little Core | 2 Little Cores | 3 Little Cores | 4 Little Cores | 4 Little Cores + 1 Big Core | 4 Little Cores + 2 Big Cores | 4 Little Cores + 3 Big Cores | 4 Little Cores + 4 Big Cores |
|---|---|---|---|---|---|---|---|---|---|
| 400300 | 1000000 | 0.834334 | 0.986262 | 1.120736 | 1.270412 | 1.463472 | 1.699407 | 2.164542 | 2.26448 |
| 883200 | 1000000 | 0.834334 | 0.986262 | 1.120736 | 1.270412 | 1.72055 | 2.082677 | 2.640086 | 2.884713 |
| 940800 | 1000000 | 0.834334 | 0.986262 | 1.120736 | 1.270412 | 1.811101 | 2.39649 | 3.006626 | 3.562624 |
| 998400 | 1000000 | 0.834334 | 0.986262 | 1.120736 | 1.270412 | 1.852728 | 2.532545 | 3.108333 | 3.613136 |
| 1056000 | 1000000 | 0.834334 | 0.986262 | 1.120736 | 1.270412 | 1.928115 | 2.547105 | 3.167443 | 3.878515 |
| 1113600 | 1000000 | 0.834334 | 0.986262 | 1.120736 | 1.270412 | 1.98535 | 2.551825 | 3.325145 | 3.991409 |
| 1190400 | 1000000 | 0.834334 | 0.986262 | 1.120736 | 1.270412 | 2.001666 | 2.679369 | 3.378476 | 4.035232 |
| 1248000 | 1000000 | 0.834334 | 0.986262 | 1.120736 | 1.270412 | 2.207717 | 2.983772 | 3.889366 | 4.695279 |
| 1305600 | 1000000 | 0.834334 | 0.986262 | 1.120736 | 1.270412 | 2.220944 | 2.997268 | 4.108508 | 4.972646 |
| 1382400 | 1000000 | 0.834334 | 0.986262 | 1.120736 | 1.270412 | 2.215145 | 3.153198 | 4.271848 | 5.345317 |
| 1612800 | 1000000 | 0.834334 | 0.986262 | 1.120736 | 1.270412 | 2.721904 | 3.854794 | 5.769573 | 5.622971 |
| 1747200 | 1000000 | 0.834334 | 0.986262 | 1.120736 | 1.270412 | 3.068176 | 4.89415 | 6.001153 | 8.035022 |
| 1804800 | 1000000 | 0.834334 | 0.986262 | 1.120736 | 1.270412 | 3.270434 | 5.294229 | 6.357236 | 6.875585 |

CORE FREQUENCY/COUNT DECISION-BASED THERMAL MITIGATION OPTIMIZATION FOR A MULTI-CORE INTEGRATED CIRCUIT

PRIORITY CLAIM AND RELATED APPLICATIONS STATEMENT

This application is a non-provisional application of and claims priority under 35 U.S.C. 119(e) to U.S. Provisional Application Ser. No. 62/432,101, filed Dec. 9, 2016, entitled, "CORE FREQUENCY/COUNT DECISION-BASED THERMAL MITIGATION OPTIMIZATION FOR A MULTI-CORE INTEGRATED CIRCUIT," the entire contents of which are hereby incorporated by reference.

DESCRIPTION OF THE RELATED ART

Portable computing devices (e.g., cellular telephones, smart phones, tablet computers, portable digital assistants (PDAs), and portable game consoles) continue to offer an ever-expanding array of features and services, and provide users with unprecedented levels of access to information, resources, and communications. To keep pace with these service enhancements, such devices have become more powerful and more complex. PortAle computing devices now commonly include a system on chip (SoC) comprising one or more chip components embedded on a single substrate (e.g., one or more central processing units (CPUs), a graphics processing unit (GPU), digital signal processors, etc.).

Portable computing devices may support various high-power use cases, such as, for example, virtual reality (VR) applications, augmented reality (AR) applications, and other CPU-intensive applications. These high-power use cases on portable computing devices or other standalone VR or AR devices may require efficient thermal mitigation techniques capable of meeting power/performance demands while consuming no greater than the device's sustained thermal power envelope. Currently, however, there is no versatile method for determining CPU operating levels at which a standalone VR/AR device or portable computing device can sustain thermal specifications. Furthermore, there is no performance/power efficient thermal management solution for CPU core(s) that can be applied to the array of chipset architectures, including, for example, synchronous processor cluster architectures and asynchronous or heterogeneous processor cluster architectures with separate or unified power rails, an example of which is referred to as a "big-.LITTLE" heterogeneous architecture.

The "big.LITTLE" and other heterogeneous architectures typically comprise a group of processor cores in which a set of relatively slower, lower-power processor cores are coupled with a set of relatively more powerful processor cores. For example, a set of processors or processor cores with a higher performance ability are often referred to as the "Big cluster" while the other set of processors or processor cores with minimum power consumption yet capable of delivering appropriate performance (but relatively less than that of the Big cluster) is referred to as the "Little cluster." Tasks may be scheduled to be performed by the Big cluster or the Little cluster according to performance and/or power requirements, which may vary based on various use cases. The Big cluster may be used for situations in which higher performance is desirable (e.g., graphics, gaming, etc.), and the Little cluster may be used for relatively lower power user cases (e.g., text applications).

To meet the power/performance demands of VR, AR, and CPU-intensive use cases for a given device chipset architecture, the process of characterization, tuning/optimization, and verification is long and iterative and may take weeks to complete. In this process, trade-offs must be made between performance, power, and thermal specifications. Furthermore, in operation, when power consumption approaches the device's sustained thermal power envelope, existing thermal mitigation techniques apply rough decision algorithms that either reduce CPU frequency or hotplug (i.e., remove) one or more of the CPU cores.

Accordingly, there is a need in the art for improved systems and methods for providing optimal power/performance thermal mitigation in high-power uses cases on portable computing devices and standalone VR/AR devices having a plurality of processing cores with varying arrays of chipset architectures.

SUMMARY OF THE DISCLOSURE

Various embodiments of methods, systems, and computer programs are disclosed for providing core frequency/count decision-based thermal mitigation optimization in a portable computing device having a plurality of processing cores. An exemplary method comprises storing a power sweep table defining a power consumption value for each of a plurality of core frequency and core count combinations for an integrated circuit having a plurality of processing cores. A search table is generated by filtering the power sweep table based on one or more configuration parameters associated with the integrated circuit. A target power level is selected to sustain a thermal power envelope for the integrated circuit. The search table is traversed to find one of the plurality of core frequency and core count combinations having a corresponding power consumption value that matches the target power level.

An exemplary system comprises an integrated circuit having a plurality of processing cores, a memory, and a core frequency/count thermal mitigation optimization module. The memory stores a power sweep table defining a power consumption value for each of a plurality of core frequency and core count combinations for the integrated circuit. The core frequency/count thermal mitigation optimization module comprises logic configured to: generate a search table by filtering the power sweep table based on one or more configuration parameters associated with the integrated circuit; determine a target power level to sustain a thermal power envelope for the integrated circuit; and traverse the search table to find one of the plurality of core frequency and core count combinations having a corresponding power consumption value that matches the target power level.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

FIG. 5 is an exemplary embodiment of a search space table generated by filtering the power sweep table of FIG. 4.

DETAILED DESCRIPTION

Figure 1:
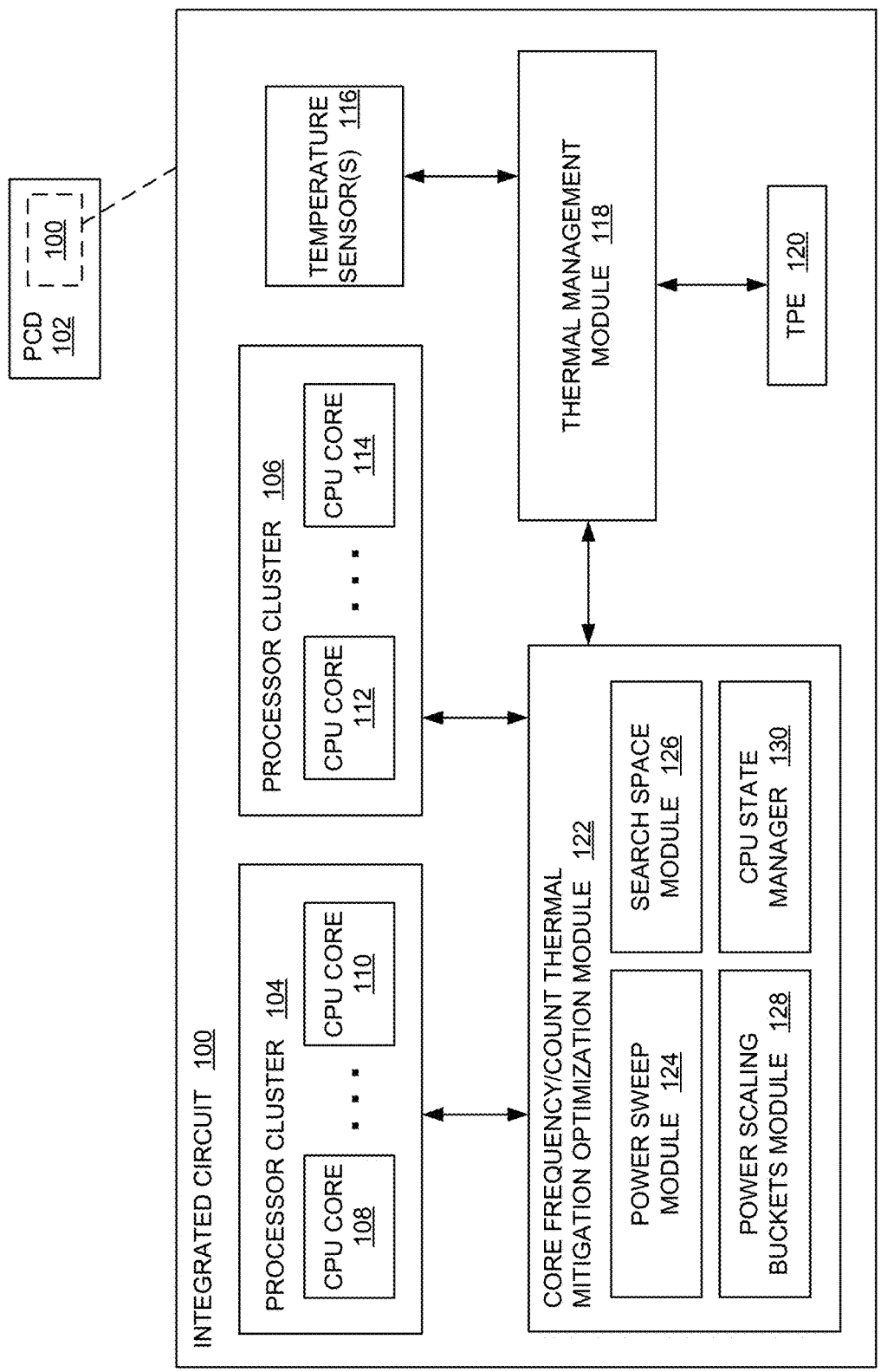
FIG. 1 is a block diagram of an embodiment of a system for providing core frequency/count decision-based thermal mitigation optimization in a portable computing device having a plurality of processing cores.

The word "exemplary" is used herein to mean "serving as an example, instance, or illustration." Any aspect described herein as "exemplary" is not necessarily to be construed as preferred or advantageous over other aspects.

In this description, the term "application" or "image" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, it will be understood that the terms "thermal" and "thermal energy" may be used in association with a device or component capable of generating or dissipating energy that can be measured in units of "temperature." Consequently, it will further be understood that the term "temperature," with reference to some standard value, envisions any measurement that may be indicative of the relative warmth, or absence of heat, of a "thermal energy" generating device or component. For example, the "temperature" of two components is the same when the two components are in "thermal" equilibrium.

The terms "workload," "process load," "process workload," "use case workload" and the like are used interchangeably and generally directed toward the processing burden, or percentage of processing burden, associated with a given processing component in a given embodiment.

The terms "thermal mitigation technique(s)," "thermal policies," "thermal power management," "thermal mitigation measure(s)," "throttling" and the like are used interchangeably. Notably, one of ordinary skill in the art will recognize that, depending on the particular context of use, any of the terms listed in this paragraph may serve to describe hardware and/or software operable to increase performance at the expense of thermal energy generation, decrease thermal energy generation at the expense of performance, or alternate between such goals.

The term "portable computing device" ("PCD") is used to describe any device operating on a limited capacity power supply, such as a battery. Although battery operated PCDs have been in use for decades, technological advances in rechargeable batteries coupled with the advent of third generation ("3G"), fourth generation ("4G"), and fifth generation ("5G") wireless technology have enabled numerous PCDs with multiple capabilities. Therefore, a PCD may be a cellular telephone, a satellite telephone, a pager, a personal digital assistant, a smart phone, a navigation device, a smartbook or reader, a media player, a combination of the aforementioned devices, a laptop or tablet computer with a wireless connection, among others.

The term "use case" or "operating level" is used herein to refer to an instantaneous state of PCD operation in delivering functionality to a user. Inevitably, a use case is tied to the execution of one or more applications by a PCD, such as a gaming application, a virtual reality (VR) application, an augmented reality (AR) application, or other CPU-intensive applications. As such, it will be understood that any given use case or operating level dictates that one or more components in a PCD are actively consuming power and delivering functionality. Notably, not all use cases require the same combination of active components and/or the same levels of power consumption by active components. Moreover, although a given use case or operating level may be largely defined by a single application in execution (such as a gaming, VR, or AR application), it will be understood that other applications unrelated to said single application may also be running and contributing to the aggregate power consumption and functionality of the use case.

Figure 2:
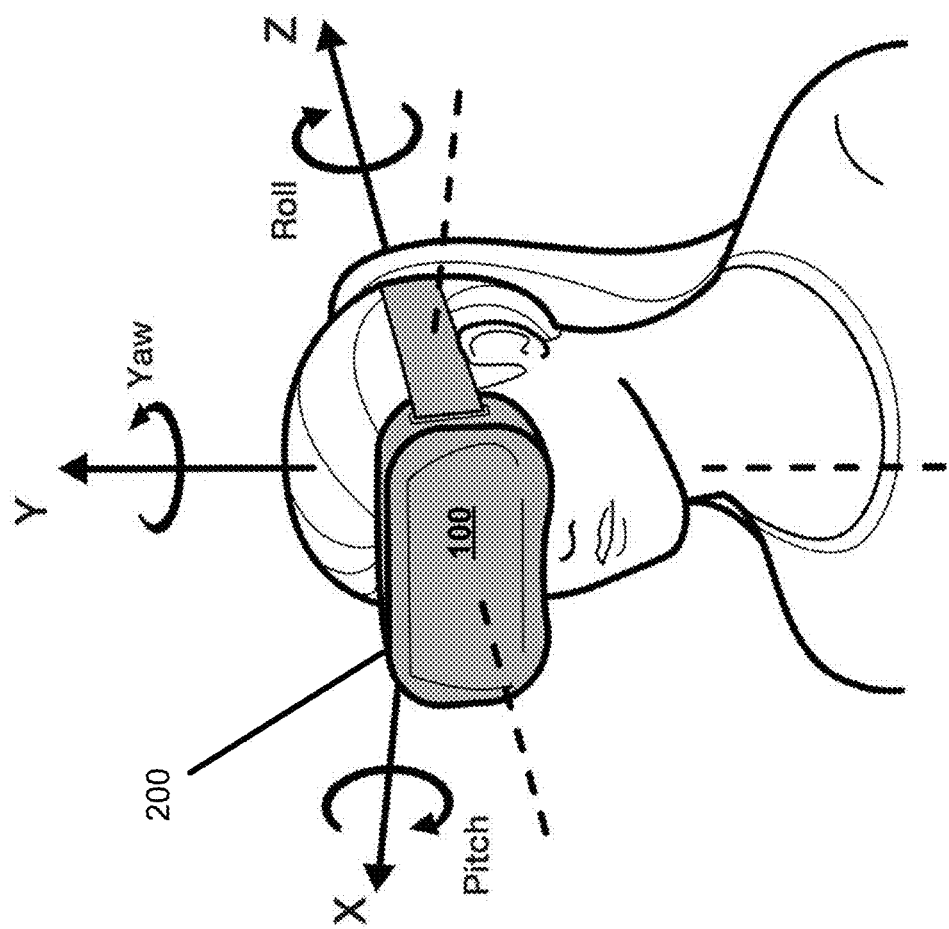
FIG. 2 is an exemplary embodiment of a virtual reality device for incorporating the system of FIG. 1.

FIG. 1 is a block diagram of an embodiment of a system for providing core frequency/count decision-based thermal mitigation optimization in a portable computing device 102 or a virtual reality device 200 (FIG. 2) having a plurality of processing cores. The portable computing device 102 may comprise a smart phone, a portable digital assistant (PDA), a portable game console, a tablet computer, or a wearable device. It should be appreciated that core frequency/count decision-based thermal mitigation optimization may be particularly advantageous in high-power use cases, such as, for example, VR/AR applications, or other CPU-intensive applications. Efficient power/performance decisions may be particularly critical in VR use case scenarios given that use cases for VR devices may require higher sustained power compared to typical smartphone use cases. Inefficient thermal mitigation decisions may lead to frame jankiness and subsequent nausea and/or user discomfort. The virtual reality device 200 may comprise any virtual reality systems (e.g., headsets, goggles, eyewear, external VR display(s), projection systems, etc.). As illustrated in the embodiment of FIG. 2, the system may be incorporated in an integrated headmount display (HMD) 200 that is worn by a user. In other embodiments, some of components in the system may be integrated into the HMD 200 while others may be provided by an external processing system (e.g., a portable computing device 102) or external display (e.g., a computer display, a projection display, etc.).

As illustrated in the embodiment of FIG. 1, the integrated circuit 100 may comprise a plurality of central processing unit (CPU) cores, graphics processing unit (GPU) cores, digital signal processors (DSPs), or other processing devices. The integrated circuit 100 may comprise any of an array of chipset architectures, chipset class types, etc. It should be appreciated that the plurality of processing cores may be provided via a single multi-core processor or any of a variety of processor cluster architectures (e.g., a synchronous processor cluster architecture, an asynchronous or heterogeneous processor cluster architecture). For heterogeneous processor cluster architectures, the clusters may have separate power rails or, in other embodiments, may have a unified power rail.

As known in the art, each processor cluster may comprise one or more processors or processor cores (e.g., central processing unit (CPU), graphics processing unit (GPU), digital signal processor (DSP), etc.). In the embodiment of FIG. 1, the processor clusters 104 and 106 may comprise a "big.LITTLE" heterogeneous architecture, as described above, in which the processor cluster 104 comprises a Little cluster and the processor cluster 106 comprises a Big cluster. The Little processor cluster 104 comprises a plurality of central processing unit (CPU) cores 108 and 110, which are relatively slower and consume less power than the CPU cores 112 and 114 in the Big processor cluster 106. It should be appreciated that the Big cluster CPU cores 112 and 114 may be distinguished from the Little cluster CPU cores 108 and 110 by, for example, a relatively higher instructions per cycle (IPC), higher operating frequency, and/or having a micro-architectural feature that enables relatively more performance but at the cost of additional power. Furthermore, additional processor clusters, such as, for example, a processor cluster comprising one or more GPU cores.

As further illustrated in FIG. 1, the integrated circuit 100 further comprises various components for managing thermal energy generation of the plurality of processing cores. In the embodiment of FIG. 1, the integrated circuit 100 (or the PCD 102) includes one or more temperature sensors 116, a thermal management module 118, a sustained thermal power envelope (TPE) 120, and a core frequency/count thermal mitigation optimization module 122.

Managing thermal energy generation, without unnecessarily impacting quality of service ("QoS"), can be accomplished via thermal power envelope (TPE) 120, which accounts for multiple heat sources in the PCD 102 and by monitoring a power budget and/or one or more sensor measurements that correlate with an outer shell temperature (i.e., "skin" temperature of the PCD 102). By closely monitoring the power budget in view of the skin temperature, the thermal management module 119 may systematically and individually adjust performance settings of active processing components in an effort to optimize user experience without exceeding a predefined sustained thermal power envelope (e.g., TPE 120). By selectively adjusting performance settings as a function of user experience, the thermal mitigation system of FIG. 1 may optimize QoS under any use case workload.

Existing thermal management solutions in multi-core systems typically manage PCD skin temperature without regard for the performance requirements of a running use case. As a PCD runs a given use case, the ongoing consumption of power by the active components generates thermal energy that, when dissipated, may cause the PCD to reach or exceed the sustained thermal power envelope for surface temperature. In this regard, it should be appreciated that sustained TPE refers to a maximum rate of aggregate power consumption at which the PCD skin temperature may be maintained at or below a certain threshold, such skin temperature threshold being a function of the ambient environmental temperature to which the PCD is exposed. When the skin temperature threshold is approached or exceeded, existing thermal management systems react with a "one-size-fits-all" approach by throttling the performance of active processing components (e.g., CPU, GPU, LCD brightness) to predefined levels regardless of the use case. When power consumption approaches the PCD's sustained thermal power envelope, existing thermal mitigation techniques are limited to rough decision algorithms that either reduce CPU frequency or hotplug (i.e., remove) one or more of the CPU cores, which may achieve the goal of staying within the sustained TPE, but do so inefficiently and at an expense to user experience when, for example, processing core(s) are throttled unnecessarily. Furthermore, to meet the power/performance demands of VR, AR, and CPU-intensive use cases for a given device chipset architecture, the process of characterization, tuning/optimization, and verification is long and iterative and may take weeks to complete.

In this regard, the system of FIG. 1 leverages a core frequency/count thermal mitigation optimization module 122, which is generally configured to determine an optimal combination of processing cores with associated frequencies in which the PCD 102 consumes no more than the sustained thermal power envelope (TPE 120). It should be appreciated that the core frequency/count mitigation decision may be implemented as an application that runs on the PCD 102. As described below in more detail, based on a variety of inputs, the core frequency/count mitigation decision may intelligently and dynamically decide, for example, when throttling should occur, whether to hotplug, what level it should mitigate to (e.g., one or more core frequencies), which combination of processor cores are optimal, etc.

Figure 3:
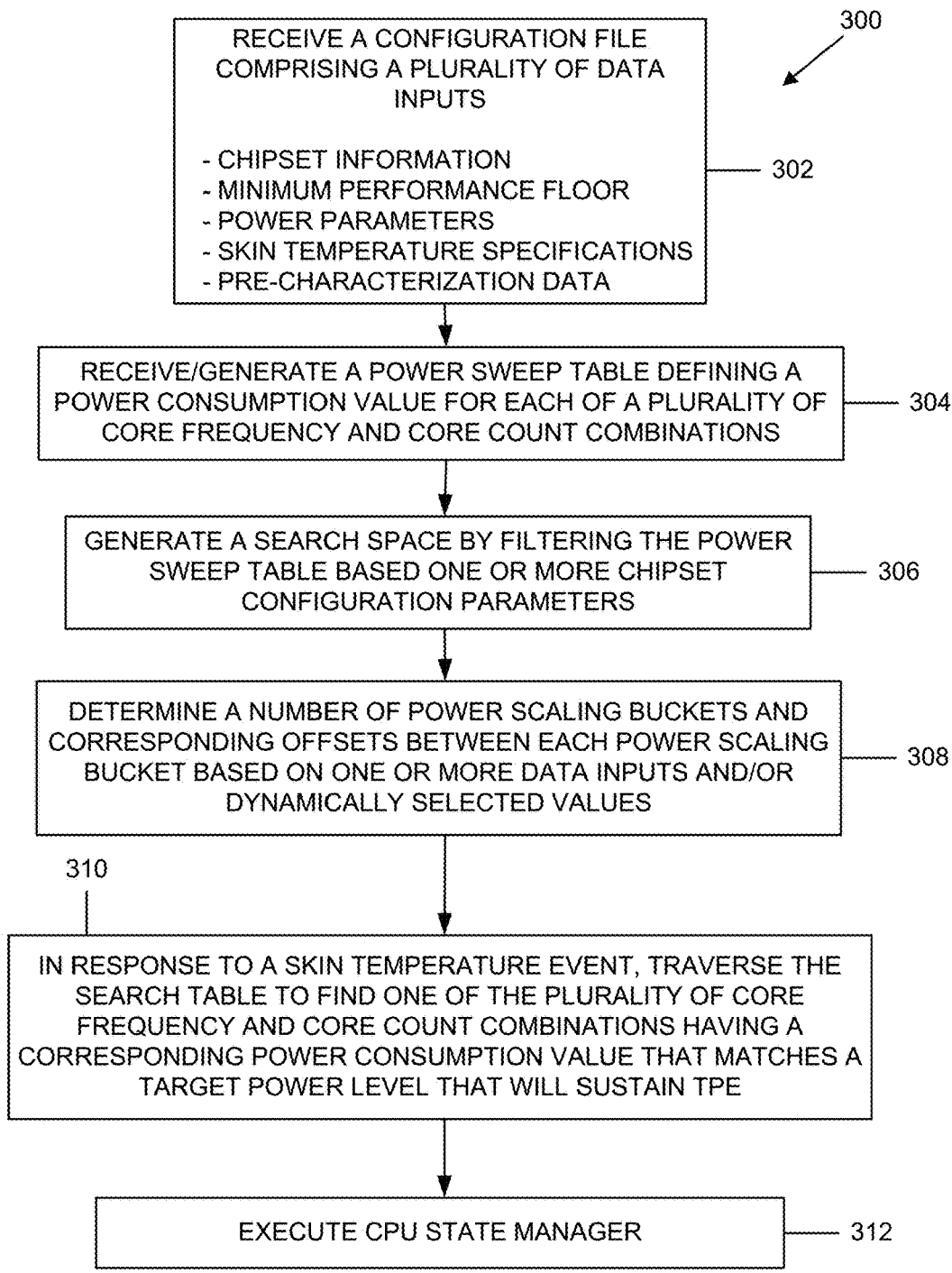
FIG. 3 is a flowchart illustrating an embodiment of a method for providing core frequency/count decision-based thermal mitigation optimization in a portable computing device having a plurality of processing cores.

In the embodiment of FIG. 1, the core frequency/count thermal mitigation optimization module 122 comprises a power sweep module 124, a search space module 126, a power scaling buckets module 128, and a CPU state manager 130. FIG. 3 illustrates an exemplary workflow or method 300 implemented by one or more of the modules 124, 126, 128, and 130 for providing core frequency/count decision-based thermal mitigation optimization. At block 302, a configuration file corresponding to the target device chipset architecture may be received. The configuration file may specify a plurality of configuration parameters used as inputs by the core frequency/count mitigation decision algorithm.

The configuration parameters may comprise chipset data, minimum performance data, power parameters, skin temperature specifications, and pre-characterization results associated with the chipset. The chipset data may specify, for example, a number of processing cores on the chipset and a chipset class type (e.g., single vs. multi-cluster, synchronous vs. asynchronous/heterogeneous cluster architecture, unified power rail vs. separate power rails, etc.).

The minimum performance data may specify a minimum performance floor defined by, for example, lowest frequency core(s) that are allowed to mitigate to, a maximum number of cores for hotplugging, a lowest frequency threshold, etc.

The power parameters may comprise, for example: a maximum power level that the PCD 102 is designed to dissipate in a typical operation (e.g., thermal design power); a number of power scaling buckets (i.e., a number of power levels); an offset or interval between power levels. For example, for a given OEM device, the power parameters may define a maximum power level of 4.5 W, five power scaling buckets, and an offset of 0.5 W between power buckets.

It should be appreciated that the skin temperature specifications may vary based on the type of material(s) being used in the PCD 102. For example, a skin temperature threshold may be 40 degrees (C.) for plastic/glass materials and 45 degrees (C.) for metals.

The pre-characterization results may be stored in a power sweep table and a search space table both of which are described below. For example, for a given OEM device, the TPE may be 2.0 W at a skin temperature specification of 40 degrees (C.).

In general, the workflow involves determining a number of power scaling buckets and/or bucket offsets for target use cases. The power sweep module 124 may sweep through each of the available CPU core frequencies and core count combinations and collect power consumption values for each combination while running CPU workload(s) on a device containing a target chipset architecture.

At block 304, the power sweep module 124 may receive the power sweep table from the pre-characterization results in the configuration file or generate the power sweep table via a process that measures power consumption for all core frequency/count combinations. The power sweep table defines a power consumption value for each of a plurality of core frequency and core count combinations corresponding to the target multi-core chipset. In this regard, it should be appreciated that the power sweep table may be generated by sweeping through each of the available CPU core frequency and core count combinations, and collect power consumption values while running CPU workload(s) on the PCD 102 containing the target chipset.

Figure 4:
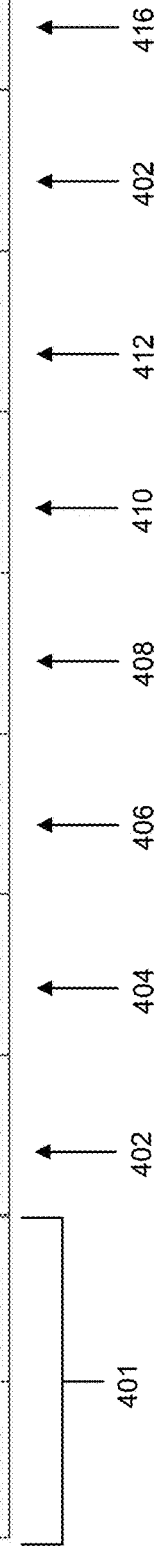
FIG. 4 is an exemplary embodiment of a power sweep table used as input to the core frequency/count decision-based thermal mitigation optimization module in FIG. 1.

FIG. 4 illustrates an exemplary power sweep table 400 associated with a heterogeneous processor cluster architecture. The heterogeneous process cluster architecture comprises 4 Little cores and 4 Big cores. As illustrated in FIG. 4, the power sweep table 400 comprises a plurality of cells containing power consumption values for a plurality of Big/Little core frequency values and core count combinations. Rows 401 define pairs of Big/Little core frequency values. The top row pair 401 comprises a lowest core frequency pair in which the Big core frequency value is 400 MHz and the Little core frequency value is 1 GHz. The core frequency values incrementally increase to a maximum core frequency pair in the bottom row pair 401 having a Big core frequency value of approximately 1.8 GHz and the Little core frequency value of 1 GHz.

As further illustrated in FIG. 4, column 402 specifies the power consumption values at each of the Big/Little core frequency pairs when a single Little core is operational. Column 404 specifies the power consumption values at each of the Big/Little core frequency pairs when a two Little cores are operational. Column 406 specifies the power consumption values at each of the Big/Little core frequency pairs when a three Little cores are operational. Column 408 specifies the power consumption values at each of the Big/Little core frequency pairs when all four Little cores are operational. Column 410 specifies the power consumption values at each of the Big/Little core frequency pairs when all four Little cores and one Big core are operational. Column 412 specifies the power consumption values at each of the Big/Little core frequency pairs when all four Little cores and two Big cores are operational. Column 414 specifies the power consumption values at each of the Big/Little core frequency pairs when all four Little cores and three Big cores are operational. Column 416 specifies the power consumption values at each of the Big/Little core frequency pairs when all four Little cores and all four Big cores are operational. In this manner, for a heterogeneous processor cluster architecture comprising N total cores and M Big/Little frequency value pairs, the power sweep table 400 comprises a N×M table of power consumption values.

Referring again to FIG. 3, at block 306, the search space module 126 may generate a search space table by filtering the power sweep table 400 based on the one or more configuration parameters associated with the chipset described above. FIG. 5 illustrates an exemplary search space table 500, which comprises a filtered portion of the data contained in the power sweep table 400. The search space table 500 may be determined based on, for example, minimum performance floor data provided via the configuration file. In the example of FIG. 5, the search space table 500 reflects a lowest core frequency value of 1.06 GHz for the Big cores and the fixed core frequency value of 1 GHz for the Little cores. The search space table 500 further reflects that the 4 Little cores are not permitted to be hotplugged. These minimum performance floor constraints define the search space table 500 as the power consumption value cells contained within the box identified with reference numeral 500.

It should be appreciated that, in other embodiments, the search space table 500 may be provided as an input table built into the pre-characterization results stored in the configuration file described above.

Figure 6:
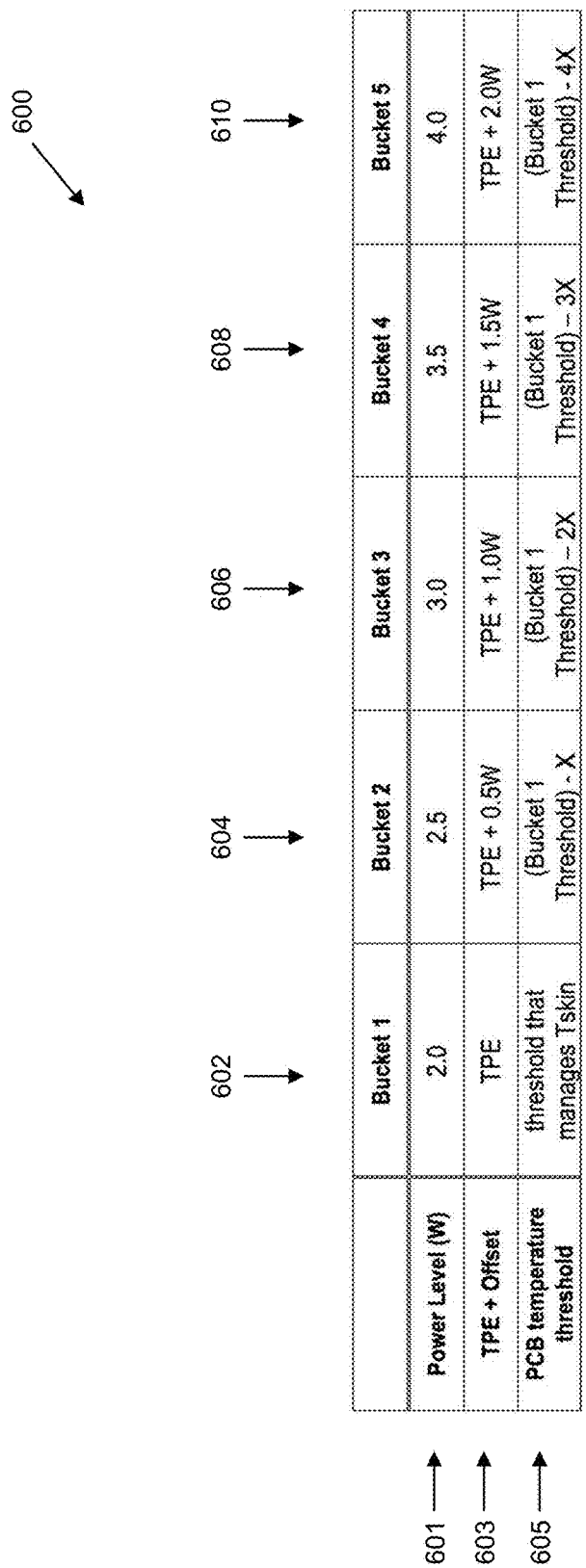
FIG. 6 is an exemplary embodiment of a power scaling buckets table for storing data associated with a plurality of power scaling buckets used as input to the core frequency/count decision-based thermal mitigation optimization module in FIG. 1.

At block 308, the method 300 may determine a number of power scaling buckets and corresponding offsets between each power scaling bucket. The power scaling buckets may be based on one or more of the data inputs from the configuration file (block 302) and/or dynamically selected values. It should be appreciated that the power scaling buckets comprise the available operating points, spanning from the PCD's TPE 120 to a maximum power level at which a thermal/performance intensity maybe sustained. While any number of power scaling buckets may be determined, FIG. 6 illustrates an exemplary embodiment of a data structure comprising five power scaling buckets. The embodiment of FIG. 6 comprises five power scaling buckets, each of which define a power level (row 601), a TPE+offset value (row 603), and a printed circuit board (PCB) temperature threshold (row 605). It should be appreciated that the PCB temperature threshold represents a trigger for moving to a next state in the CPU state manager 130. As illustrated in the embodiment of FIG. 6, a first power scaling bucket (column 602) may have a power level of 2.0 W and a TPE+offset value equal to TPE. The PCB temperature threshold for the first power scaling bucket represents the temperature threshold at which the device does not exceed the surface temperature limit/requirements, which may be defined by a device manufacturer's policy or by industry or regulatory bodies. As illustrated in FIG. 6, each additional power scaling bucket, which may be predefined or dynamically determined, represents an offset from the first power scaling bucket. A second power scaling bucket (column 604) may have a power level of 2.5 W, a TPE+offset value equal to TPE+0.5 W, and a PCB temperature threshold value equal to the bucket 1 threshold minus a value X. A third power scaling bucket (column 606) may have a power level of 3.0 W, a TPE+offset value equal to TPE+1.0 W, and a PCB temperature threshold value equal to the bucket 1 threshold minus a value 2x. A fourth power scaling bucket (column 608) may have a power level of 3.5 W, a TPE+offset value equal to TPE+1.5 W, and a PCB temperature threshold value equal to the bucket 1 threshold minus a value 3x. A fifth power scaling bucket (column 610) may have a power level of 4.0 W, a TPE+offset value equal to TPE+2.0 W, and a PCB temperature threshold value equal to the bucket 1 threshold minus a value 5x.

It should be appreciated that the power scaling buckets may be static, predefined, or dynamically calculated. A use case may specify static or predefined power scaling buckets or opt to have power scaling buckets redefined on-the-fly based on changing workload conditions. Predefined power scaling buckets may be calculated based on input including TPE, a maximum power level, a number of power levels, and an offset between buckets. In other embodiments, variable power scaling buckets may be calculated dynamically to meet varying performance/thermal requirements for a range of use cases.

Referring again to the method 300 in FIG. 3, when a skin temperature event occurs in the PCD 102, at block 310, the method 300 traverses the search table to find one of the plurality of core frequency and core count combinations having a corresponding power consumption value that matches a target power level that will sustain the TPE 120.

Figure 7:
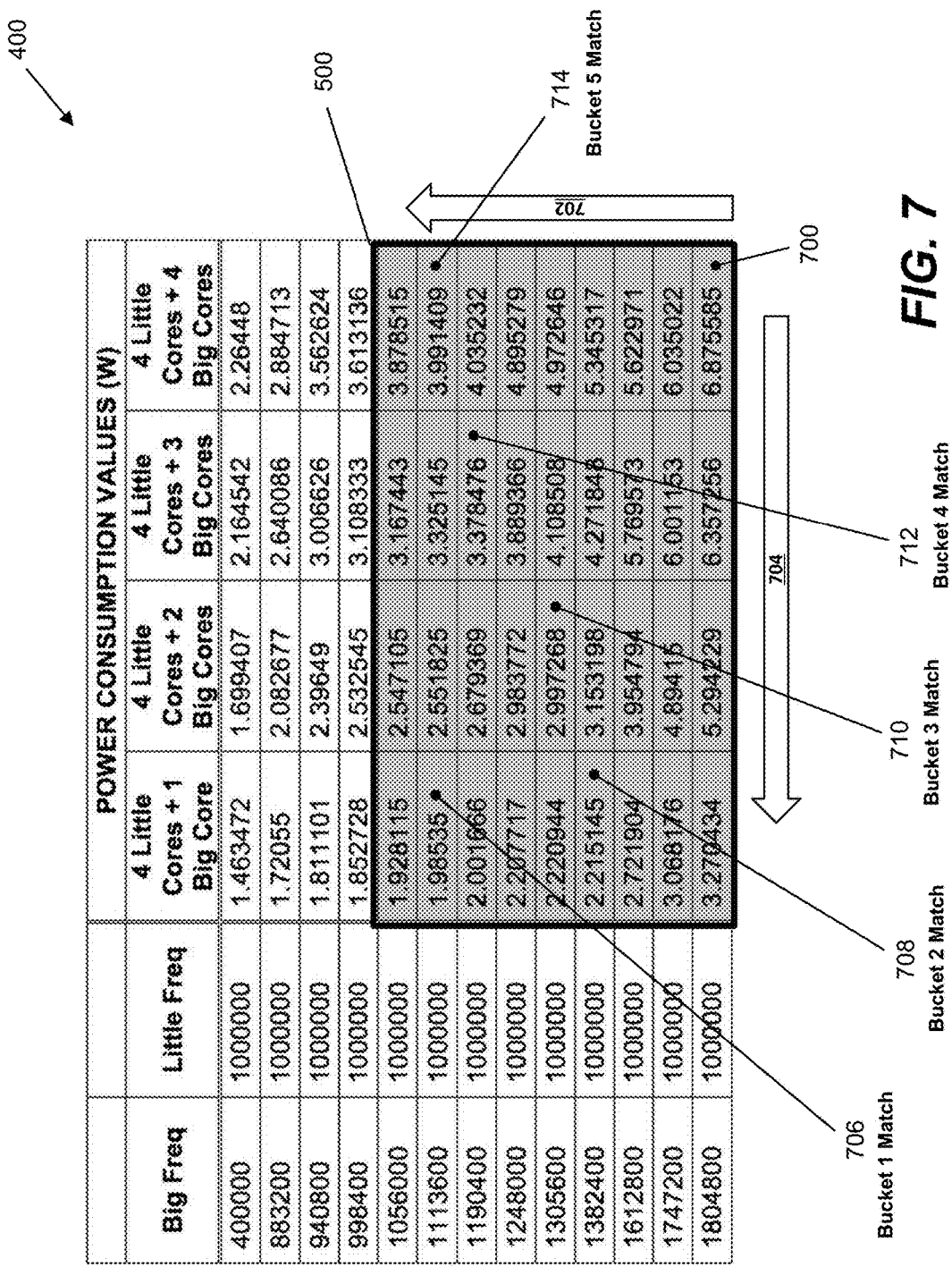
FIG. 7 illustrates the search space table of FIG. 4 with matching power consumption values for each of the power scaling buckets illustrated in FIG. 6.
Figure 8:
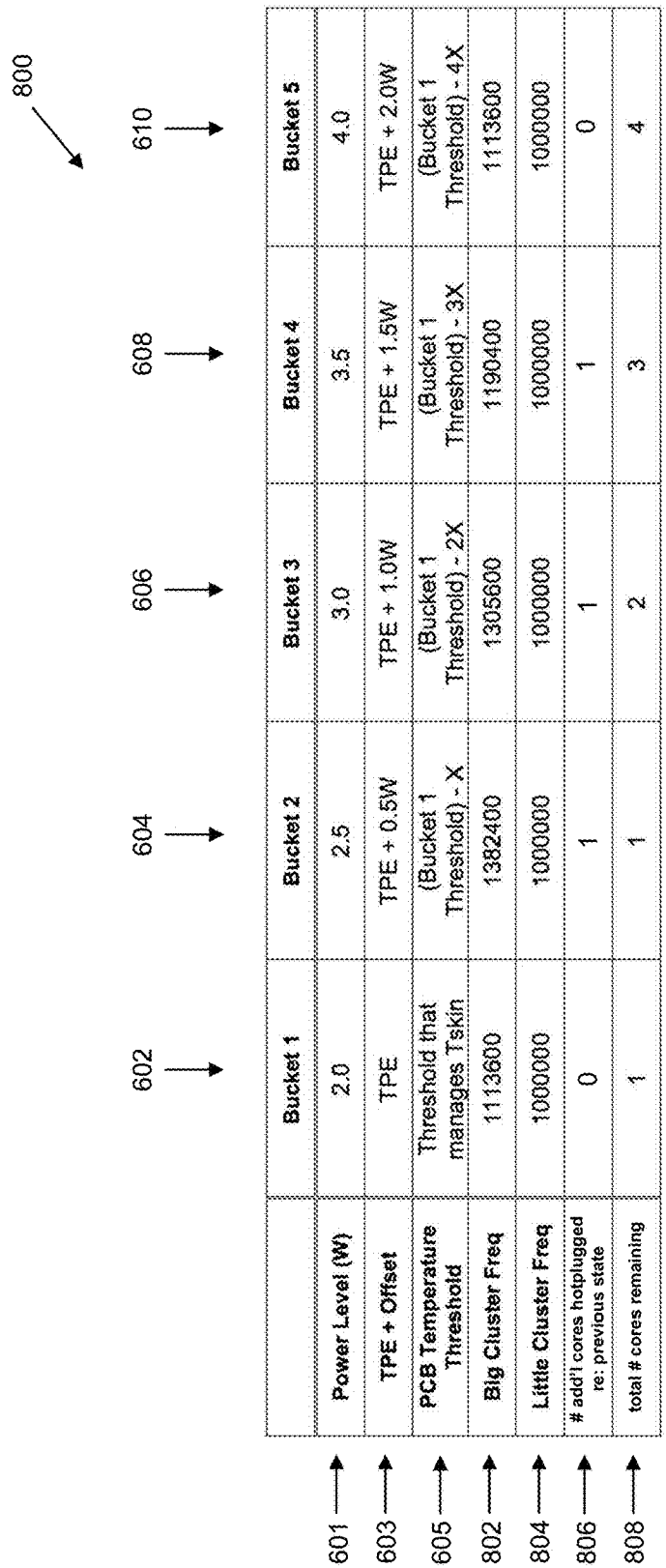
FIG. 8 illustrates a further embodiment of a power scaling buckets table for managing CPU states.

FIG. 7 illustrates exemplary embodiments of several traversals of the search table 500 illustrated in FIG. 5. The search table traversals illustrated in FIG. 7 correspond to the power scaling buckets illustrated in FIG. 8. FIG. 8 illustrates the data from FIG. 6 with the addition of rows 802, 804, 806, and 808. The data values associated with row 802 define a Big core frequency value associated with the corresponding power buckets 602, 604, 606, 608, and 610. The data values associated with row 804 define a Little core frequency value associated with the corresponding power buckets 602, 604, 606, 608, and 610. Referring to FIG. 8, it should be appreciated that data stored in rows 802, 804, and 806 represent the actions that are determined based on the search table traversal. In this regard, rows 802, 804, and 806 represent thermal mitigation actions that may be determined based on the search table traversal. In other words, rows 802, 804, and 806 comprise the output(s) of the search table traversal. Row 808 comprises additional output representing a number of remaining Big cores after hotplugging occurs. It should be further appreciated that rows 806 or 808 may be used to decide if and/or how many cores need to be taken offline to achieve the target power scaling bucket.

Referring again to the exemplary search table traversal illustrated in FIG. 7, in order to determine output values for rows 802,804 and 806 (FIG. 8), the search table 500 is searched for each of the power scaling buckets, starting with the highest power value. Rows 802, 804, 806, and 605 comprise the values used by the CPU state manager 130 (represented by block 312 in the flowchart of FIG. 3 and the state diagram of FIG. 9) to execute CPU mitigation decisions.

The traversal illustrated in the exemplary embodiment of FIG. 7 may operate as follows. The traversal process may start at the highest power value (cell 700) in column 416. The power levels contained in column 416 may be searched until a matching power value is reached. It should be appreciated that the power value in cell 714 represents a match for the fifth power scaling bucket (i.e., Bucket 5). As mentioned above, table labels 610 and 601 in FIG. 6 may comprise x-y coordinates (i.e., ordered pairs). In this manner, the search table 500 may be traversed from the right most column 416 and move from the highest power value in the bottom row (cell 700) upward to the top row containing the lowest power value. The search traversal may move navigate from one column to the next column to the left (e.g., from column 416 to column 414 and so on) when a matching power level is not found in the current column.

As illustrated in FIG. 7, the Bucket 5 power level search is complete when the first power level that is less than or equal to the target value (i.e., 4.0 W as identified by row/column pair 610/601 in FIG. 8) is found. When the Bucket 5 power level is found (cell 714), the search algorithm may define the Big Cluster frequency value corresponding to the row/column pair 610/802 as the frequency value from FIG. 8 labeled "Big Cluster Freq", which corresponds to the same row as the row in which the power level was found in. The search algorithm may define the Little Cluster frequency value corresponding to the row/column pair 610/804 as the frequency value from FIG. 8 labeled "Little Cluster Freq", which corresponds to the same row as the row in which the power level was found in. The search algorithm may further define the value in row/column pair 610/806 as the number of columns moved to find bucket 5 power value. The search algorithm may define the value in row/column pair 610/808 as total number of cores minus the value in row/column pair 610/806.

As further illustrated in FIG. 7, the search traversal may proceed to find a power value (cell 712) for the fourth power scaling bucket (i.e., Bucket 4) that matches the target value of 3.5 W as identified by row/column pair 608/601. The search algorithm may resume traversal from the column and row that corresponds to the power level found for Bucket 5. In this manner, the traversal moves from the current row to the top most row, and moving one column to the left when a power level is not found in the current column. When moving one column to the left, the new column is searched from the bottom most row containing the highest power value. The Bucket 4 power level search is complete when the first power level that is less than or equal to the target value (i.e., 3.5 W as identified by row/column pair 608/601) is found. When the Bucket 4 power level match is found (cell 712), the search algorithm may define the Big Cluster frequency value corresponding to the row/column pair 608/802 as the frequency value from FIG. 8 labeled "Big Cluster Freq", which corresponds to the same row as the row in which the power level was found in. The search algorithm may define the Little Cluster value corresponding to the row/column pair 608/804 as the frequency value from FIG. 8 labeled "Little Cluster Freq", which corresponds to the same row as the row in which the power level was found in. The search algorithm may further define the value in row/column pair 608/806 as the number of columns moved from the Bucket 5 power value to find the Bucket 4 power value.

The search algorithm may define row/column pair 608/808 as the value for row/column pair 610/808 minus the value in row/column pair 608/806.

It should be further appreciated that Buckets 3, 2, and 1, respectively, may be traversed in a similar manner as Bucket 4. As further illustrated in FIG. 7, the search traversal may proceed to find a power value (cell 710) for the third power scaling bucket (i.e., Bucket 3) that matches the target value of 3.0 W as identified by row/column pair 606/601. The search traversal may resume from the column and row that corresponds to the power level found for Bucket 4. In this manner, the traversal moves from the current row to the top most row, and moving one column to the left when a power level is not found in the current column. When moving one column to the left, the new column is searched from the bottom most row containing the highest power value. The Bucket 3 power level search is complete when the first power level that is less than or equal to the target value (i.e., 3.0 W as identified by row/column pair 606/601) is found. When the Bucket 3 power level match is found (cell 710), the search algorithm may define the Big Cluster frequency value corresponding to the row/column pair 606/802 as the frequency value from FIG. 8 labeled "Big Cluster Freq", which corresponds to the same row as the row in which the power level was found in. The search algorithm may define the Little Cluster value corresponding to the row/column pair 606/804 as the frequency value from FIG. 8 labeled "Little Cluster Freq", which corresponds to the same row as the row in which the power level was found in. The search algorithm may further define the value in row/column pair 606/806 as the number of columns moved from the Bucket 4 power value to find the Bucket 3 power value. The search algorithm may define row/column pair 606/808 as the value for row/column pair 608/808 minus the value in row/column pair 606/806.

Regarding Bucket 2, the search traversal may proceed to find a power value (cell 708) for the second power scaling bucket that matches the target value of 2.5 W as identified by row/column pair 604/601. The search traversal may resume from the column and row that corresponds to the power level found for Bucket 3. In this manner, the traversal moves from the current row to the top most row, and moving one column to the left when a power level is not found in the current column. When moving one column to the left, the new column is searched from the bottom most row containing the highest power value. The Bucket 2 power level search is complete when the first power level that is less than or equal to the target value (i.e., 2.5 W as identified by the row/column pair 604/601) is found. When the Bucket 2 power level match is found (cell 708), the search algorithm may define the Big Cluster frequency value corresponding to the row/column pair 604/802 as the frequency value from FIG. 8 labeled "Big Cluster Freq", which corresponds to the same row as the row in which the power level was found in. The search algorithm may define the Little Cluster frequency value corresponding to the row/column pair 604/804 as the frequency value from FIG. 8 labeled "Little Cluster Freq", which corresponds to the same row as the row in which the power level was found in. The search algorithm may further define the value in row/column pair 604/806 as the number of columns moved from the Bucket 3 power value to find the Bucket 2 power value. The search algorithm may define row/column pair 604/808 as the value for row/column pair 606/808 minus the value in row/column pair 604/806.

Regarding Bucket 1, the search traversal may proceed to find a power value (cell 706) for the first power scaling bucket that matches the target value of 2.0 W as identified by row/column pair 602/601. The search traversal may resume from the column and row that corresponds to the power level found for Bucket 2. In this manner, the traversal moves from the current row to the top most row, and moving one column to the left when a power level is not found in the current column. When moving one column to the left, the new column is searched from the bottom most row containing the highest power value. The Bucket 1 power level search is complete when the first power level that is less than or equal to the target value (i.e., 2.0 W as identified by the row/column pair 602/601) is found. When the Bucket 1 power level match is found (cell 706), the search algorithm may define the Big Cluster frequency value corresponding to the row/column pair 602/802 as the frequency value from FIG. 8 labeled "Big Cluster Freq", which corresponds to the same row as the row in which the power level was found in. The search algorithm may define the Little Cluster frequency value corresponding to the row/column pair 602/804 as the frequency value from FIG. 8 labeled "Little Cluster Freq", which corresponds to the same row as the row in which the power level was found in. The search algorithm may further define the value in row/column pair 602/806 as the number of columns moved from the Bucket 2 power value to find the Bucket 1 power value. The search algorithm may define row/column pair 602/808 as the value for row/column pair 604/808 minus the value in row/column pair 602/806.

Figure 9:
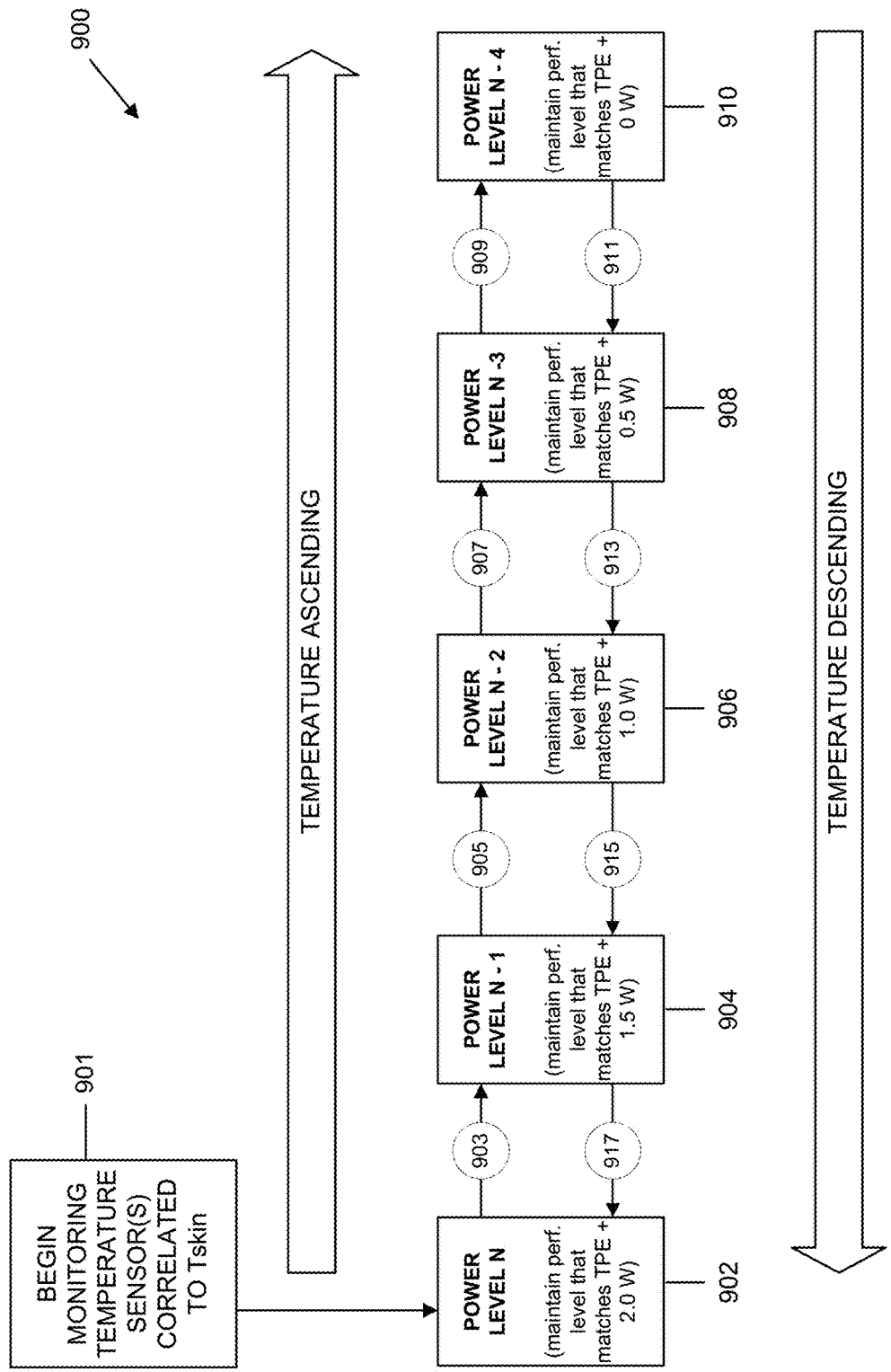
FIG. 9 is a block/flow diagram illustrating an embodiment of the CPU state manager of FIG. 1.

Having described an exemplary traversal of search table 500, FIG. 9 illustrates an exemplary execution of thermal mitigation actions performed by the CPU state manager 130. It should be appreciated that the traversal of search table 500 may be performed, resulting in the output data illustrated in FIG. 8. The CPU state manager 130 may access the output data to determine the thermal mitigation actions needed according to the corresponding power scaling bucket. In this regard, it should be appreciated that the appropriate thermal mitigation actions are represented in rows 802, 804, 806, and 808 based on the corresponding power scaling bucket.

FIG. 9 illustrates a flow and state transition diagram 900 for the CPU state manager 130. The state transition diagram comprises CPU states 902, 904, 906, 908, and 910. As illustrated in FIG. 9, at block 901, the temperature sensor(s) 116 may be monitored when the PCD 102 begins to approach a skin temperature ($T_{skin}$). In response, CPU state manager 130 may enter CPU state 902. CPU state 902 corresponds to a power level N (e.g., power scaling bucket 610 in FIGS. 6, 8, and 9) during which the CPU state manager 130 maintains the core frequency/core count performance level associated with the power consumption value that matches TPE+2.0 W. CPU state 904 corresponds to a power level N−1 (e.g., power scaling bucket 608) during which the CPU state manager 130 maintains the core frequency/core count performance level associated with the power consumption value that matches TPE+1.5 W. CPU state 906 corresponds to a power level N−2 (e.g., power scaling bucket 606) during which the CPU state manager 130 maintains the core frequency/core count performance level associated with the power consumption value that matches TPE+1.0 W. CPU state 908 corresponds to a power level N−3 (e.g., power scaling bucket 604) during which the CPU state manager 130 maintains the core frequency/core count performance level associated with the power consumption value that matches TPE+0.5 W. CPU state 910 corresponds to a power level N−4 (e.g., power scaling bucket 602) during which the CPU state manager 130 maintains the core frequency/core count performance level associated with the power consumption value that matches TPE+0 W.

As temperatures increase, the CPU state manager 130 may transition from CPU state 902 to 904 (state transition 903), from CPU state 904 to 906 (state transition 905), from CPU state 906 to 908 (state transition 907), and from CPU state 908 to 910 (state transition 909). When in CPU state 902, if the temperature threshold is reached for power level N−1 (state transition 903), the CPU state manager 130 may execute the thermal mitigation actions for Bucket N−1 from FIG. 8. For example, assuming N=5, the CPU state manager 130 may execute the following actions: set the frequency of the Big cores to the value associated with the row/column pair 608/802; set the frequency of the Little cores to the value associated with row/column pair 608/804; set the number of online cores to the value in row/column pair 608/808. When in CPU state 904, if the temperature threshold is reached for power level N−2 (state transition 905), the CPU state manager 130 may execute the thermal mitigation actions for Bucket N−2 from FIG. 8. For example, assuming N=5, the CPU state manager 130 may execute the following actions: set the frequency of the Big cores to the value associated with the row/column pair 606/802; set the frequency of the Little cores to the value associated with row/column pair 606/804; set the number of online cores to the value in row/column pair 606/808. When in CPU state 906, if the temperature threshold is reached for power level N−3 (state transition 907), the CPU state manager 130 may execute the thermal mitigation actions for Bucket N−3 from FIG. 8. For example, assuming N=5, the CPU state manager 130 may execute the following actions: set the frequency of the Big cores to the value associated with the row/column pair 604/802; set the frequency of the Little cores to the value associated with row/column pair 604/804; set the number of online cores to the value in row/column pair 604/808. When in CPU state 908, if the temperature threshold is reached for power level N−4 (state transition 909), the CPU state manager 130 may execute the thermal mitigation actions for Bucket N−4 from FIG. 8. For example, assuming N=5, the CPU state manager 130 may execute the following actions: set the frequency of the Big cores to the value associated with the row/column pair 602/802; set the frequency of the Little cores to the value associated with row/column pair 602/804; set the number of online cores to the value in row/column pair 602/808.

As temperatures decrease, the CPU state manager 130 may transition from CPU state 910 to 908 (state transition 911), from CPU state 908 to 906 (state transition 913), from CPU state 906 to 904 (state transition 915), and from CPU state 904 to 902 (state transition 917). When in CPU state 910, if the temperature reduces below the threshold set for power level N−4 (state transition 911), the CPU state manager 130 may execute the thermal mitigation actions for Bucket N−3 (e.g., Bucket 2, assuming N=5). When in CPU state 908, if the temperature reduces below the threshold set for power level N−3 (state transition 913), the CPU state manager 130 may execute the thermal mitigation actions for Bucket N−2 (e.g., Bucket 3, assuming N=5). When in CPU state 906, if the temperature reduces below the threshold set for power level N−2 (state transition 915), the CPU state manager 130 may execute the thermal mitigation actions for Bucket N−1 (e.g., Bucket 4, assuming N=5). When in CPU state 904, if the temperature reduces below the threshold set for power level N−1 (state transition 917), the CPU state manager 130 may execute the thermal mitigation actions for Bucket N (e.g., Bucket 5, assuming N=5).

Figure 10:
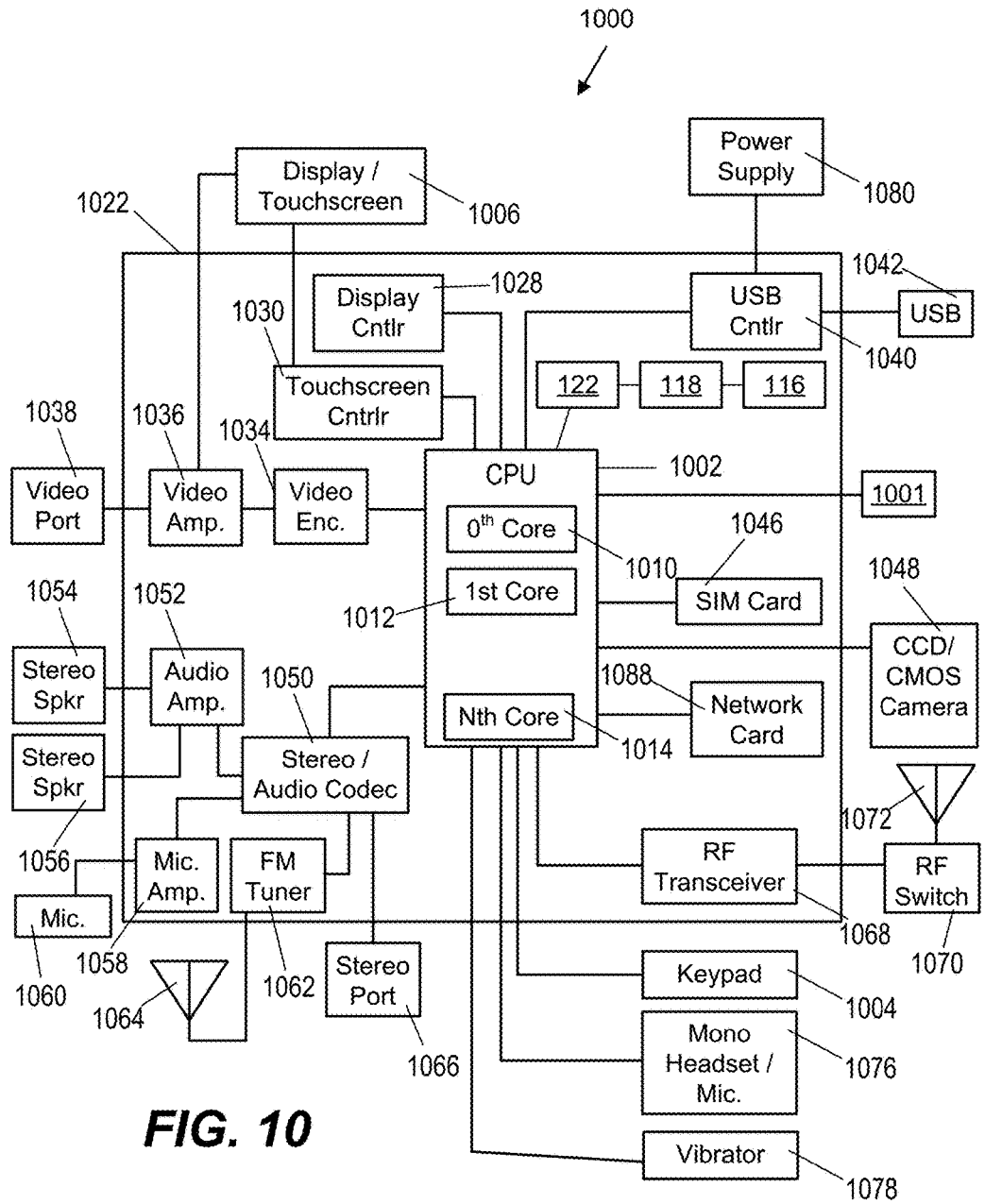
FIG. 10 illustrates an exemplary embodiment of a portable computing device for incorporating the system of FIG. 1.

The systems and methods described above may be incorporated into any desirable computing system. FIG. 10 illustrates the system incorporated in an exemplary portable computing device (PCD) 1000. A system-on-chip (SoC) 1022 may include the core frequency/count thermal mitigation optimization module 122, the thermal management module 118, and the temperature sensor(s) 116. A display controller 1028 and a touch screen controller 1030 may be coupled to one or more of the processor clusters. In turn, the touch screen display 1006 may be external to the on-chip system 1022 and may be coupled to the display controller 1028 and the touch screen controller 1030.

FIG. 10 further shows that a video encoder 1034, e.g., a phase alternating line (PAL) encoder, a sequential color a memoire (SECAM) encoder, or a national television system(s) committee (NTSC) encoder, is coupled to one or more of the processor clusters 104 and 106. Further, a video amplifier 1036 is coupled to the video encoder 1034 and the touch screen display 1006. Also, a video port 1038 is coupled to the video amplifier 1036. As shown in FIG. 10, a universal serial bus (USB) controller 1040 is coupled to one or more of the processor clusters. Also, a USB port 1042 is coupled to the USB controller 1040. Memory 1001 and a subscriber identity module (SIM) card 1046 may also be coupled to the processor cluster(s).

Further, as shown in FIG. 10, a digital camera 1048 may be coupled to the processor cluster(s). In an exemplary aspect, the digital camera 1048 is a charge-coupled device (CCD) camera or a complementary metal-oxide semiconductor (CMOS) camera.

As further illustrated in FIG. 10, a stereo audio coder-decoder (CODEC) 1050 may be coupled to the processor cluster(s). Moreover, an audio amplifier 1052 may be coupled to the stereo audio CODEC 1050. In an exemplary aspect, a first stereo speaker 1054 and a second stereo speaker 1056 are coupled to the audio amplifier 1052. A microphone amplifier 1058 may be also coupled to the stereo audio CODEC 1050. Additionally, a microphone 1060 may be coupled to the microphone amplifier 1058. In a particular aspect, a frequency modulation (FM) radio tuner 1062 may be coupled to the stereo audio CODEC 1050. Also, an FM antenna 1064 is coupled to the FM radio tuner 1062. Further, stereo headphones 1066 may be coupled to the stereo audio CODEC 1050.

FIG. 10 further illustrates that a radio frequency (RF) transceiver 1068 may be coupled to the processor cluster(s). An RF switch 1070 may be coupled to the RF transceiver 1068 and an RF antenna 1072. A keypad 1004, a mono headset with a microphone 1076, and a vibrator device 1078 may be coupled to the processor cluster(s).

FIG. 10 also shows that a power supply 1080 may be coupled to the on-chip system 1022. In a particular aspect, the power supply 380 is a direct current (DC) power supply that provides power to the various components of the PCD 1000 that require power. Further, in a particular aspect, the power supply is a rechargeable DC battery or a DC power supply that is derived from an alternating current (AC) to DC transformer that is connected to an AC power source.

FIG. 10 further indicates that the PCD 1000 may also include a network card 1088 that may be used to access a data network, e.g., a local area network, a personal area network, or any other network. The network card 1088 may be a Bluetooth network card, a WiFi network card, a personal area network (PAN) card, a personal area network ultra-low-power technology (PeANUT) network card, a television/cable/satellite tuner, or any other network card well known in the art. Further, the network card 1088 may be incorporated into a chip, i.e., the network card 1088 may be a full solution in a chip, and may not be a separate network card 1088.

Referring to FIG. 10, it should be appreciated that the memory 1001, the RAM card 1005, touch screen display 1006, the video port 1038, the USB port 1042, the camera 1048, the first stereo speaker 1054, the second stereo speaker 1056, the microphone 1060, the FM antenna 1064, the stereo headphones 1066, the RF switch 1070, the RF antenna 1072, the keypad 1074, the mono headset 1076, the vibrator 1078, and the power supply 1080 may be external to the on-chip system 1022.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, NAND flash, NOR flash, M-RAM, P-RAM, R-RAM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for providing optimal power/performance thermal mitigation in a portable computing device having a plurality of processing cores, the method comprising:
    storing a power sweep table defining a power consumption value for each of a plurality of core frequency and core count combinations for an integrated circuit having a plurality of processing cores;
    generating a search table by filtering the power sweep table based on one or more configuration parameters associated with the integrated circuit;
    defining a plurality of power scaling buckets, each power scaling bucket having a corresponding power level; and
    for each power scaling bucket of the plurality of power scaling buckets, traversing the search table to find one of the plurality of core frequency and core count combinations having a corresponding power consumption value that matches the power level corresponding to the power scaling bucket, wherein traversing the search table comprises starting at a maximum core count and a maximum core frequency and searching decreasing core frequencies corresponding to the maximum core count, and if no matching power consumption value is found then decreasing the core count and searching decreasing core frequencies corresponding to the decreased core count.

2. The method of claim 1, wherein the plurality of processing cores comprises a heterogeneous processor cluster architecture having at least a first processor with a first performance range and a second processor with a second performance range, the first performance range being less than the second performance range.

3. The method of claim 2, wherein the heterogeneous processor cluster architecture comprises a unified power rail.

4. The method of claim 1, wherein the one or more configuration parameters associated with the integrated circuit comprises one or more of a minimum performance floor, a number of cores, a chipset class type, a maximum power level, a number of available power levels, an offset between the available power levels, and one or more skin temperature specifications.

5. The method of claim 1, wherein the power sweep table is generated in a pre-characterization process.

6. The method of claim 1, wherein the plurality of power scaling buckets are dynamically calculated.

7. The method of claim 1, wherein the portable computing device comprises one of a smart phone, a tablet computer, and a standalone virtual reality device.

8. A system for providing optimal power/performance thermal mitigation in a portable computing device having a plurality of processing cores, the system comprising:
    means for storing a power sweep table defining a power consumption value for each of a plurality of core frequency and core count combinations for an integrated circuit having a plurality of processing cores;

means for generating a search table by filtering the power sweep table based on one or more configuration parameters associated with the integrated circuit;

means for defining a plurality of power scaling buckets, each power scaling bucket having a corresponding power level; and means, for each power scaling bucket of the plurality of power scaling buckets, for traversing the search table to find one of the plurality of core frequency and core count combinations having a corresponding power consumption value that matches the power level corresponding to the power scaling bucket, wherein traversing the search table comprises starting at a maximum core count and a maximum core frequency and searching decreasing core frequencies corresponding to the maximum core count, and if no matching power consumption value is found then decreasing the core count and searching decreasing core frequencies corresponding to the decreased core count.

9. The system of claim 8, wherein the plurality of processing cores comprises a heterogeneous processor cluster architecture having a unified power rail.

10. The system of claim 8, wherein the one or more configuration parameters associated with the integrated circuit comprises one or more of a minimum performance floor, a number of cores, a chipset class type, a maximum power level, a number of available power levels, an offset between the available power levels, and one or more skin temperature specifications.

11. The system of claim 8, wherein the means for defining a plurality of power scaling buckets comprises a means for dynamically calculating the plurality of power scaling buckets.

12. The system of claim 8, wherein the portable computing device comprises one of a smart phone, a tablet computer, and a standalone virtual reality device.

13. A computer program embodied in a non-transitory computer-readable medium and executable by a processor for providing optimal power/performance thermal mitigation in a portable computing device having a plurality of processing cores, the computer program comprising logic configured to:

store a power sweep table defining a power consumption value for each of a plurality of core frequency and core count combinations for an integrated circuit having a plurality of processing cores;

generate a search table by filtering the power sweep table based on one or more configuration parameters associated with the integrated circuit;

define a plurality of power scaling buckets, each power scaling bucket having a corresponding power level; and for each power scaling bucket of the plurality of power scaling buckets, traverse the search table to find one of the plurality of core frequency and core count combinations having a corresponding power consumption value that matches the power level corresponding to the power scaling bucket, wherein traversing the search table comprises starting at a maximum core count and a maximum core frequency and searching decreasing core frequencies corresponding to the maximum core count, and if no matching power consumption value is found then decreasing the core count and searching decreasing core frequencies corresponding to the decreased core count.

14. The computer program of claim 13, wherein the plurality of processing cores comprises a heterogeneous processor cluster architecture having separate power rails.

15. The computer program of claim 13, wherein the one or more configuration parameters associated with the integrated circuit comprises one or more of a minimum performance floor, a number of cores, a chipset class type, a maximum power level, a number of available power levels, an offset between the available power levels, and one or more skin temperature specifications.

16. The computer program of claim 13, wherein the plurality of power scaling buckets are dynamically calculated.

17. The computer program of claim 13, wherein the portable computing device comprises one of a smart phone, a tablet computer, and a standalone virtual reality device.

18. A system for providing optimal power/performance thermal mitigation in a portable computing device having a plurality of processing cores, the system comprising:

an integrated circuit comprising a plurality of processing cores;

a memory for storing a power sweep table defining a power consumption value for each of a plurality of core frequency and core count combinations for the integrated circuit; and a core frequency/count thermal mitigation optimization module comprising logic configured to:

generate a search table by filtering the power sweep table based on one or more configuration parameters associated with the integrated circuit;

define a plurality of power scaling buckets, each power scaling bucket having a corresponding power level; and traverse the search table to find one of the plurality of core frequency and core count combinations having a corresponding power consumption value that matches the power level corresponding to the power scaling bucket, wherein traversing the search table comprises starting at a maximum core count and a maximum core frequency and searching decreasing core frequencies corresponding to the maximum core count, and if no matching power consumption value is found then decreasing the core count and searching decreasing core frequencies corresponding to the decreased core count.

19. The system of claim 18, wherein the plurality of processing cores comprises a heterogeneous processor cluster architecture having at least a first processor with a first performance range and a second processor with a second performance range, the first performance range being less than the second performance range.

20. The system of claim 19, wherein the heterogeneous processor cluster architecture comprises a unified power rail.

21. The system of claim 18, wherein the one or more configuration parameters associated with the integrated circuit are stored in a configuration file comprising one or more of a minimum performance floor, a number of cores, a chipset class type, a maximum power level, a number of available power levels, an offset between the available power levels, and one or more skin temperature specifications.

22. The system of claim 18, wherein the portable computing device comprises one of a smart phone, a tablet computer, and a standalone virtual reality device.

* * * * *